April 19, 1938.  E. J. HOUDRY  2,114,303

CATALYTIC CONTACT APPARATUS

Filed July 27, 1935  3 Sheets—Sheet 2

INVENTOR
EUGENE J. HOUDRY
BY
Ira L. Nickerson
ATTORNEY

April 19, 1938. E. J. HOUDRY 2,114,303
CATALYTIC CONTACT APPARATUS
Filed July 27, 1935 3 Sheets-Sheet 3

INVENTOR
EUGENE J. HOUDRY
BY
Ira L. Nickerson
ATTORNEY

Patented Apr. 19, 1938

2,114,303

UNITED STATES PATENT OFFICE 2,114,303

CATALYTIC CONTACT APPARATUS

Eugene J. Houdry, Rosemont, Pa., assignor to Houdry Process Corporation, Dover, Del., a corporation of Delaware Application July 27, 1935, Serial No. 33,503

7 Claims. (Cl. 23—288)

The present invention relates to apparatus adapted for carrying out certain desired operations or treatments or for bringing about thermal changes, and more particularly for effecting contacting actions or chemical transformations and for controlling reaction temperatures. Apparatus of this general type preferably has suitable means embedded in a contact mass for distributing the reactants throughout such mass and/or removing the products of reaction therefrom, as illustrated, for example, in my copending application, Serial No. 611,362, filed May 14, 1932, Patent 2,042,468, June 2, 1936. The present invention particularly concerns certain structural difficulties encountered in assembling such apparatus, for example, and in keeping the parts thereof, especially the tubes or conduits, in proper adjustment. Whether or not the conduits be surrounded by material such as discussed in my aforesaid application, or with other inert or active mass, bears no limitation on this invention.

One of the immensely practical difficulties met with in using such apparatus as described in my aforesaid application is in the assembling of the conduits within the case and holding them in the desired, spaced relationship, suitably and conveniently. In large scale commercial apparatus of this type, the converter or treater may be about 30 feet high, for example, and the conduits therewithin, when the apparatus is assembled, are frequently very close together. The assembly of such apparatus involves many practical difficulties. One method disclosed in the copending application of R. H. Hammell, Serial No. 651,718, filed January 14, 1933, Patent 2,045,596, June 30, 1936, arranges all of the tubes as desired outside of the case, binds all of them together into one bundle with suitable tie-rods, and raises the bundle above the case and lowers it thereinto by means of a large crane. This made it necessary for all of the tubular conduits to be suitably joined or fastened to the upper and lower case heads or tube sheets, one series to one and the remainder to the other, and to insert all of the conduits and both tube sheets as a unit. Another method of assembly is disclosed in the copending application of T. B. Prickett et al., Serial No. 9,180, filed March 4, 1935, Patent No. 2,095,266, issued October 12, 1937.

It is among the objects of this invention to minimize certain difficulties of assembly and to simplify the problems relating thereto.

It is a further object of this invention to provide a method of assembly which eliminates the tendency of conduits to become loosened or broken from the tube sheet to which they are joined in the course of construction. These and other objects and advantages will become apparent from the description herein taken as a whole.

An important element of apparatus in this invention is one which may indifferently be termed a grid-like member, a spacer member, or, perhaps, a centering ring for the conduits. For a quick understanding of the invention, reference is had to the accompanying drawings in which.

Figure 1:
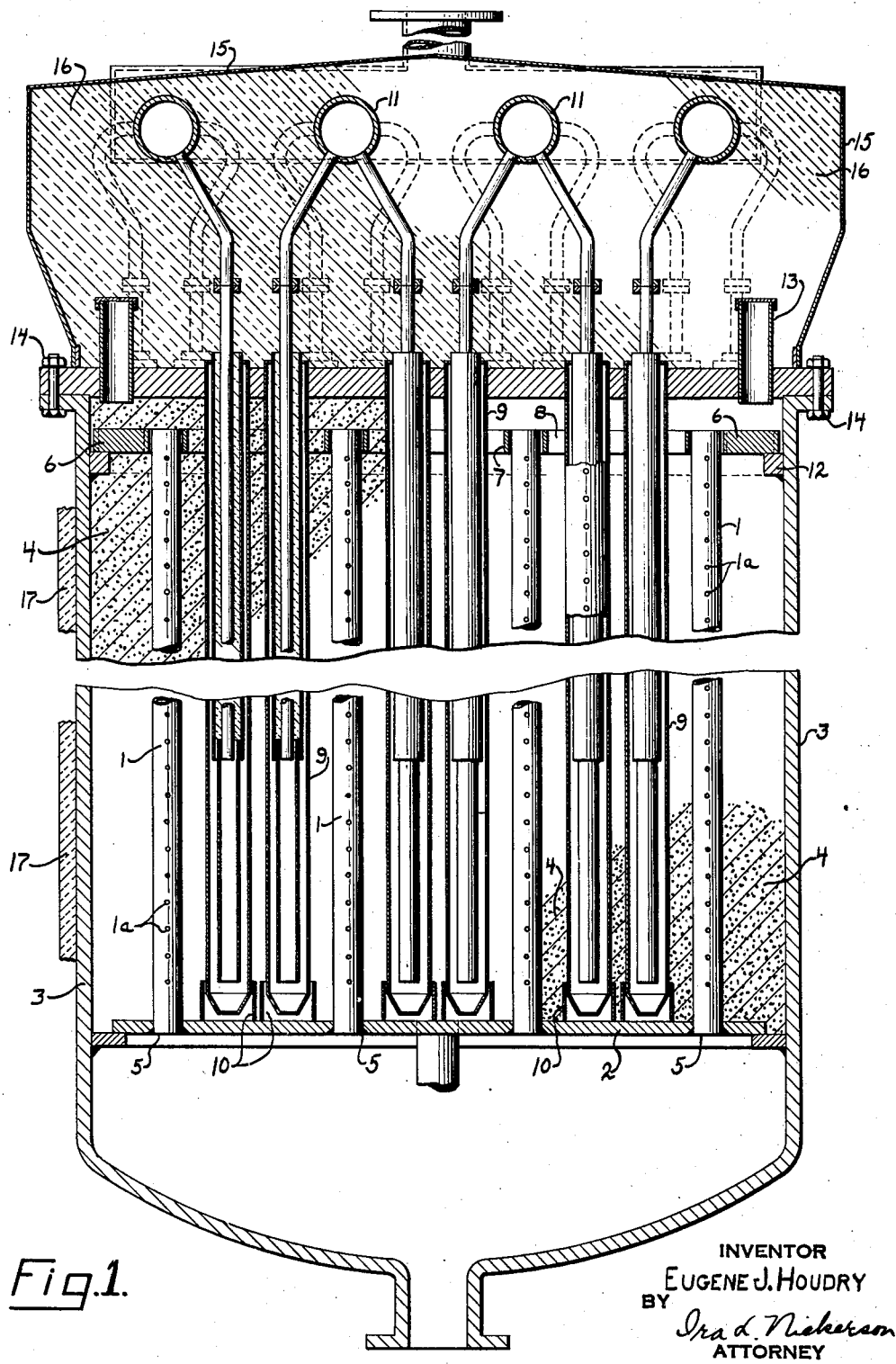
Fig. 1 is an elevational view, partly in section, of an illustrative casing providing a chamber with conduits arranged therein in parallel relation.
Figure 2:
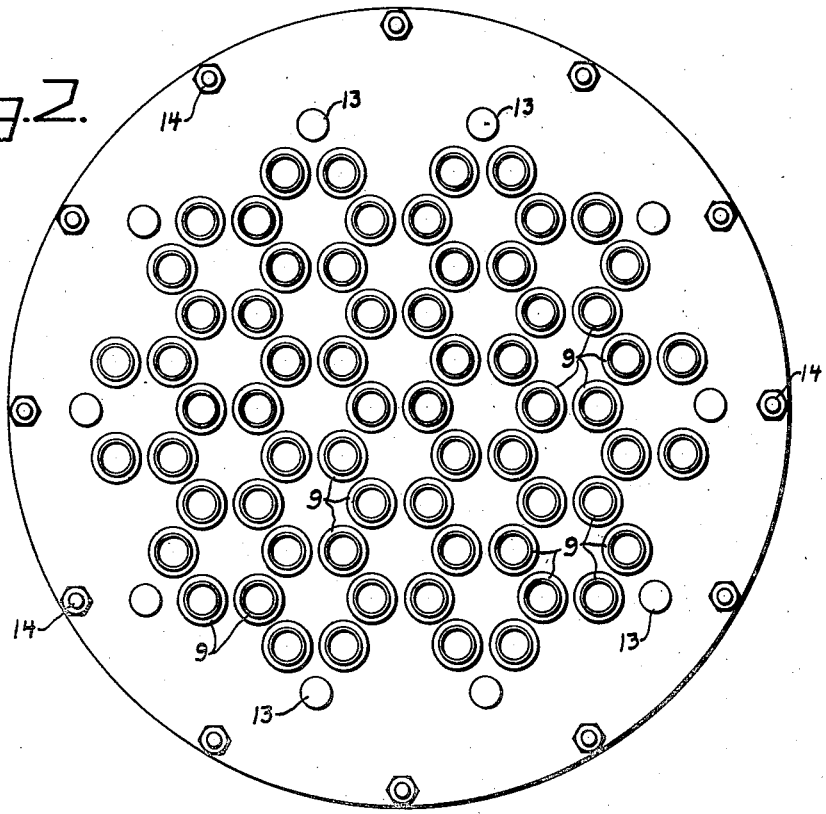
Fig. 2 is a plan view of the top tube sheet of the casing shown in Fig. 1, with the cover removed, showing the arrangement of the conduits, omitting the innermost concentric tube.
Figure 3:
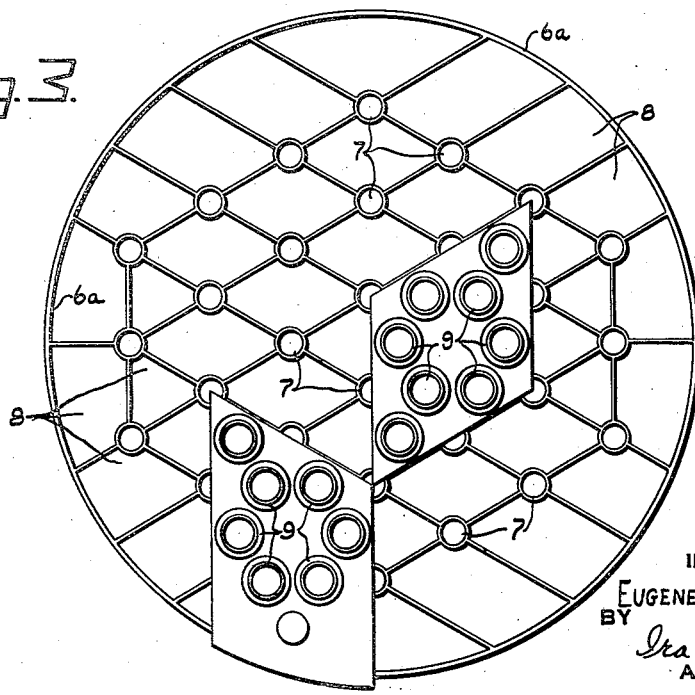
Figure 4:
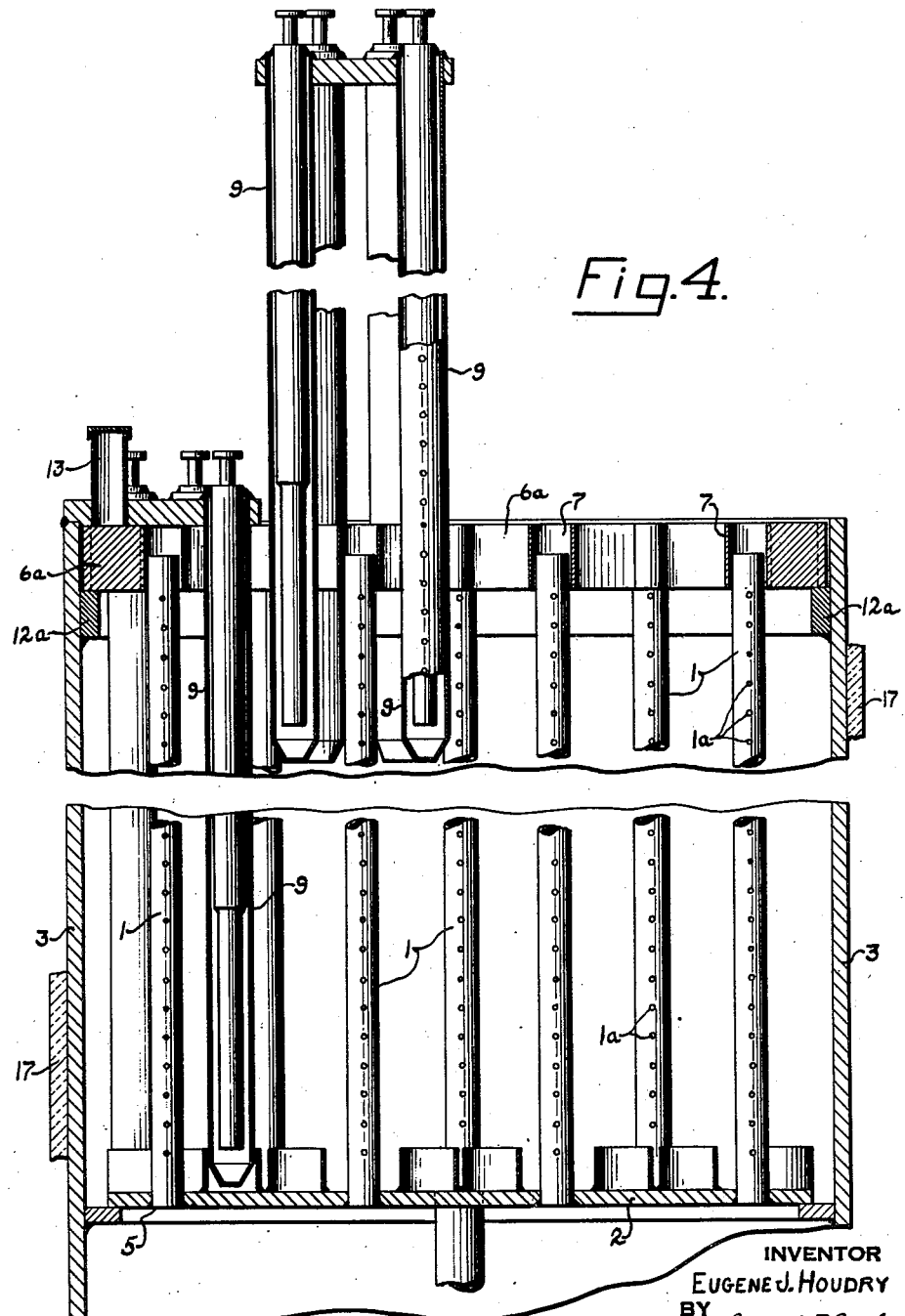

Fig. 3 is a plan view of the grid-like member or centering ring, a side, sectional view of which is shown in Fig. 1, together with two groups of conduits in place mounted on parts of a sectional upper tube sheet; and Fig. 4 is a view of the casing similar to Fig. 1, but in course of assembly and illustrating further the sectional tube sheet indicated in Fig. 3, with one group of conduits shown completely inserted and another partly inserted.

As shown, conduits 1, having perforations 1a, are mounted on the lower end or tube sheet 2 of casing 3 and communicate with any suitable ducts or passages through openings 5 in the said lower end. The upper ends of conduits 1 are held in place, during assembly and thereafter, by means of centering ring or grid-like member 6 having openings or sockets 7 adapted to reasonably snugly encircle the top ends of tubes 1 and hold the same in spaced relation and parallel alignment. Alternating or interspersed with sockets 7 are somewhat larger openings 8 adapted to permit the introduction of a second group of conduits 9 into the chamber formed within casing 3, and to guide the same into uniformly spaced interspersed parallel relation therewith. When conduits 9 are fully inserted into casing 1, their free ends are guided into and held in place by cup-like projections 10 or other suitable means on the lower tube sheet, for example, after the manner disclosed in the copending application of myself and R. H. Hammell, Serial No. 640,198, filed October 29, 1932, Patent No. 2,045,600, issued June 30, 1936. Conduits 9 communicate with headers or manifolds 11; while conduits 1 communicate with any suitable ducts leading from the bottom of the casing. One set of conduits is used to introduce fluid to be contacted into the chamber and the other set serves to withdraw fluid resulting from the contacting operation from the chamber. In the illustrative embodiment shown, conduits 1 are intended to serve to withdraw fluid while conduits 9 are intended to introduce fluid into the chamber. When the apparatus is in operation, a contact material 4, for example a fragmentary, granular or moulded porous mass, capable of effecting the desired transformation or treatment of the starting material, fills the free space between all of the conduits. Openings 13 are provided for introducing the contact mass into this chamber. The openings 13 which are spaced throughout the central section of the circular top are omitted for the sake of clarity in the drawings, but normally are located in the center of the free spaces, directly above the conduits attached to the lower end of the casing. 14 are bolts which fasten the top to the flange of the casing. 15 is a thin metal covering which confines insulation 16 around manifolds 11. The casing 3 is suitably insulated with insulation 17, shown broken away. Any known or suitable type of apertured conduits, either nested or single, may be utilized. In the present instance conduits 9 are of the nested type with controlled heat exchange conforming substantially to the disclosure of U. S. Patent No. 1,987,636 issued January 15, 1935 to T. B. Prickett and myself.

The grid-like member 6 is shown made up as one piece and supported in position within the chamber by annular support 12, which is affixed to the casing 3. However, the grid-like member may be made up in sections, welded, bolted or otherwise secured together, with each section supported to keep it stably positioned.

This invention contemplates various methods of assembling the conduits in the chamber within casing 3. Conduits 9 may be inserted into the chamber, one at a time, they may be inserted altogether as a unit, or, as specifically illustrated in Fig. 4 and Fig. 3, they may be introduced in groups. The method employed will be governed by the size of the casing and other considerations.

Fig. 4 shows one group of conduits 9 in place in the chamber and another group thereof partially inserted. It is of importance to note in this type of construction, i. e., where the top of the casing or top tube sheet is in sections, each of which has a group of conduits mounted thereon, that the grid-like member 6a is positioned immediately beneath the top of the casing; in other words, each group of conduits passes through the grid-like member until the section of the top of the casing to which they are attached, or more rigid members affixed thereto and/or to the tops of the conduits, sits on the top thereof. The grid-like member 6a, shown in Fig. 4, is of heavier, deeper construction than the grid-like member 6, shown in Fig. 1, the heavier construction being provided to support the weight of the conduits and of the composite or sectional tube sheet. Such member is, in turn, supported on annular support 12a attached to the casing 3.

In order to have straight-sided sections, which are easy to weld or otherwise join together with the configuration and arrangement of conduits shown, it is convenient to make up the top of the casing from irregularly or differently shaped sections, as suitably illustrated in Fig. 3. Of course, sections of other shape or of different or smaller size may be used.

Various other means for accomplishing substantially the same purposes as the grid-like member shown will occur to others skilled in the art upon reading the description here given. For example, in place of such a grid as the one shown, conduits 1 may be fabricated with protruding flanges, adjacent their upper ends, of such design that when the whole group of conduits 1 are joined at their lower ends, the flange members will fit together or contact each other so as to form a veritable grid and maintain the conduits in spaced parallelism, as desired. Also they will provide openings for guiding conduits 9 into properly interspersed parallel relation with conduits 1 during the insertion of the former into the chamber within casing 3. Other equivalent means will likewise become apparent to those skilled in this art and all are contemplated within the scope of the appended claims.

Further, this invention is obviously not limited to the relative arrangement of conduits shown or to the function they are described as being adapted to serve in the particular embodiment illustrated, but covers all equivalent apparatus comprehended within the scope of the appended claims.

This invention applies whether the conduits, last inserted into the chamber, be introduced altogether as one group or are assembled in place individually.

What I claim is:

1. Apparatus for effecting a fluid contacting operation which comprises an upright casing providing a chamber having walls forming the upper and lower ends thereof, the wall forming the said upper end consisting of sheet material having openings therethrough, spaced from each other, a group of perforated conduits positioned within said chamber in upright, parallel and spaced relation, conduits of said group being joined to the wall forming the lower end of said chamber and having fluid communication through said wall with a subjacent manifold, a second group of conduits extending within said chamber in interspersed and substantially parallel relation with the conduits of the aforesaid group, the conduits of said second group having fluid communication through the said openings in said sheet material forming the upper end of said chamber, and a grid-like member located immediately beneath said sheet material within said chamber and adapted to support said sheet material and to maintain the aforementioned conduits in substantially fixed, spaced relation to each other.

2. Apparatus for effecting a contacting action which comprises an upright cylindrical casing providing a cylindrical chamber having walls forming the upper and lower ends thereof, a group of perforated conduits positioned within said chamber in upright, parallel and spaced relation, conduits of said group being joined to the wall forming the lower end of said chamber and having fluid communication through said wall with a subjacent manifold, a grid-like member, positioned near the opposite wall forming the upper end of said chamber, adapted to hold the free ends of said conduits in spaced relation, as desired, and to maintain a second group of conduits in interspersed substantially parallel relation with the conduits of the aforesaid group, the conduits of said second group communicating through said upper wall with an adjacent manifold, said grid-like member having openings therein sufficiently large to permit the free passage of a fragmentary or molded contact mass therethrough when all of the aforesaid conduits are assembled within said chamber, and a contact mass of the type indicated within said chamber and around said conduits.

3. Apparatus for effecting contacting actions which comprises an upright casing providing a chamber bounded at the bottom by a wall having openings therethrough, a plurality of perforated conduits positioned substantially vertically within said chamber in parallel and spaced relation, the conduits of said plurality being joined to the said wall forming the lower end of said casing in registering relation with the openings therein, the top of said casing being formed in sections adapted to be fastened together, a second plurality of conduits, consisting of groups of conduits affixed to said sections of the top of said casing, adapted to be inserted into said chamber, one group at a time, in interspersed, spaced relation with the first-mentioned plurality of conduits, and a grid-like member, positioned immediately beneath the top end of said casing and independent thereof, adapted to maintain the conduits in spaced relation and vertically to support the said sections of the top of said casing.

4. Apparatus for effecting contacting actions which comprises an upright cylindrical casing providing a chamber bounded at the bottom by a wall having openings therethrough, a plurality of perforated conduits positioned substantially vertically within said chamber in parallel and spaced relation, the conduits of said plurality being joined to the wall forming the lower end of said casing in registering relation with the said openings therein, said casing having a top which is formed in sections adapted to be fastened together, a second plurality of conduits, consisting of groups of conduits affixed to said sections of the top of said casing, adapted to be inserted into said chamber, one group at a time, in interspersed, spaced relation with the first mentioned plurality of conduits, the conduits of said first mentioned plurality and those of said second plurality each being regularly arranged and the said sections of the top of the casing being of irregular configurations, some different than others, to permit joining said sections in straight lines in spaces between the protruding ends of said second plurality of conduits, and a rigid grid-like member positioned immediately beneath the top end of said casing and independent thereof, adapted to guide said second plurality of conduits in spaced relation therein and vertically to support the said sections of the top of the casing.

5. Apparatus for effecting a contacting action which comprises an upright cylindrical casing providing a cylindrical chamber having walls forming the upper and lower ends thereof, a group of perforated conduits positioned within said chamber in upright, parallel and spaced relation, conduits of said group being joined to the wall forming the lower end of said chamber and having fluid communication through said wall with a subjacent manifold, a grid-like member, positioned near the opposite wall forming the upper end of said chamber, adapted to hold the free ends of said conduits in spaced relation, as desired, and to guide a second group of conduits into interspersed substantially parallel relation with the conduits of the aforesaid group during the introduction of said second group into said chamber, said second group of conduits being mounted to said upper wall, said upper wall having closable openings through which a fragmentary or molded contact mass may be introduced into said chamber and said grid-like member having openings therein sufficiently large to permit the free passage of the contact mass therethrough when all of the conduits are assembled within said chamber.

6. Apparatus for carrying out treating operations which comprises a casing providing a chamber and a plurality of conduits positioned within said chamber in parallel and spaced relation and extending through an end wall of said casing, said end wall being made up of a number of sections of sheet material joined together at the edges of each other in substantially fluid-tight engagement, said sections having openings therethrough, each of said openings having one of the aforesaid conduits extending into it and mounted to the edges thereof in substantially fluid-tight engagement, thereby to provide a sectional, substantially fluid-tight end wall for the aforesaid casing.

7. Apparatus for carrying out treating operations which comprises a casing providing a chamber and a plurality of conduits positioned within said chamber, arranged in parallel and spaced relation and in symmetrical configuration and extending through an end wall of said casing, said end wall being made up of a group of variously shaped, straight sided sections of sheet material, each section having a group of the aforesaid conduits extending therethrough and mounted thereto and the sections being joined together at the edges of each other and to the said casing in substantially fluid-tight engagement so as to provide a sectional, substantially fluid-tight end wall of the aforesaid casing, and means within said chamber adjacent said end wall for supporting the latter.

EUGENE J. HOUDRY.